United States Patent [19]
Ishikura et al.

[11] Patent Number: 4,619,873
[45] Date of Patent: Oct. 28, 1986

[54] PRESERVATION DEVICE FOR LEAD STORAGE BATTERY

[75] Inventors: Yoshikazu Ishikura, Hirakata; Akira Watanabe, Neyagawa; Takanao Matsumoto, Nishinomiya, all of Japan

[73] Assignee: Sanyo Electric Co., Ltd., Japan

[21] Appl. No.: 822,671

[22] Filed: Jan. 22, 1986

Related U.S. Application Data

[63] Continuation of Ser. No. 588,542, Mar. 12, 1984, abandoned.

[30] Foreign Application Priority Data

| Mar. 16, 1983 | [JP] | Japan | 58-43920 |
| Mar. 16, 1983 | [JP] | Japan | 58-37681[U] |
| Mar. 16, 1983 | [JP] | Japan | 58-37682[U] |
| Apr. 15, 1983 | [JP] | Japan | 58-56821[U] |
| Jul. 13, 1983 | [JP] | Japan | 58-128356 |
| Aug. 4, 1983 | [JP] | Japan | 58-143553 |
| Aug. 5, 1983 | [JP] | Japan | 58-144043 |
| Nov. 30, 1983 | [JP] | Japan | 58-227349 |

[51] Int. Cl.$^4$ ............................................. H01M 2/10
[52] U.S. Cl. ..................................... 429/48; 429/100; 429/121; 429/122
[58] Field of Search ................. 429/48, 121, 122, 100

[56] References Cited

U.S. PATENT DOCUMENTS

| 3,930,887 | 1/1976 | Conner | 429/121 |
| 4,098,961 | 7/1978 | Sabatino | 429/48 |
| 4,473,623 | 9/1984 | Ishikura et al. | 429/48 |

Primary Examiner—Donald L. Walton
Attorney, Agent, or Firm—Darby & Darby

[57] ABSTRACT

The present invention discloses a preservation device for lead storage battery comprising: a lead storage battery including at least one negative plate, at least one positive plate, at least one separator between said negative and positive plates, an electrolyte holdingly impregnated by said negative & positive plates and said separator and limited in amount such that substantially there is no electrolyte liberated from said negative & positive plates and said separator, and external terminals having one ends respectively connected to said negative and positive plates and the other ends exposed to the outside of the lead storage battery vessel; and an impedance means connected between said external terminals of said lead storage battery during its preservation.

Such preservation device permits to prevent a battery preserved in such device from being decreased in capacity without requiring troublesome maintenance such as supplementary charging at regular intervals, even if it is preserved for a long period of time.

16 Claims, 35 Drawing Figures

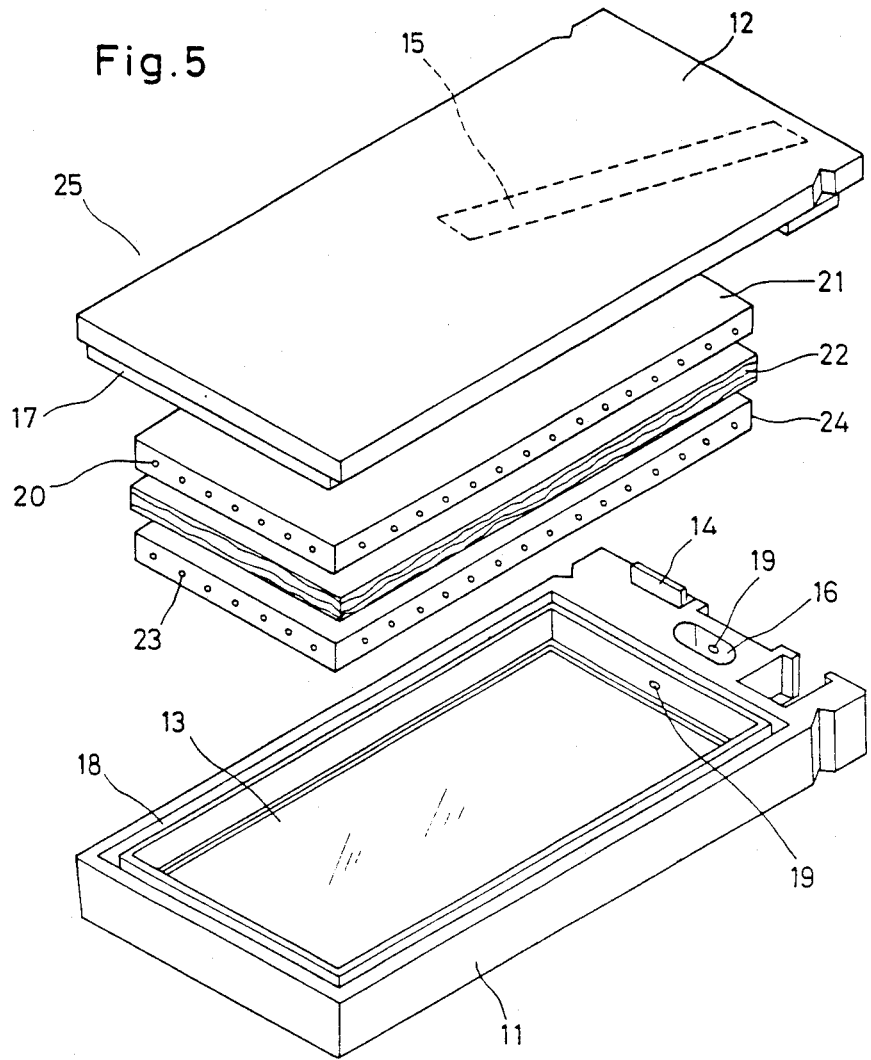

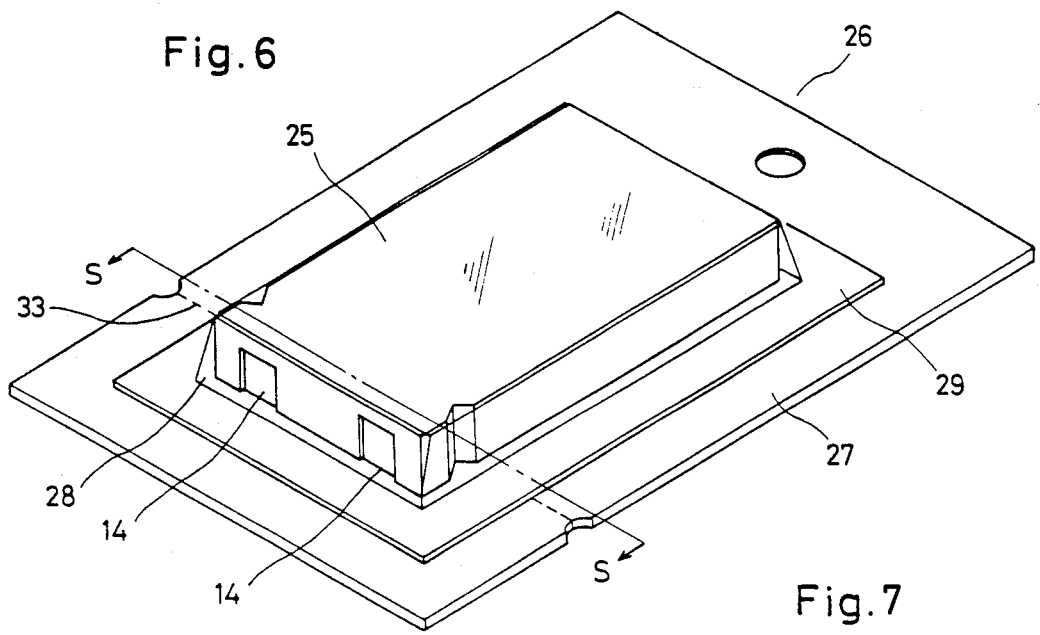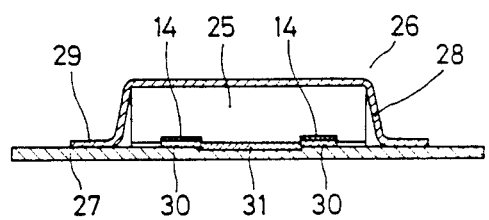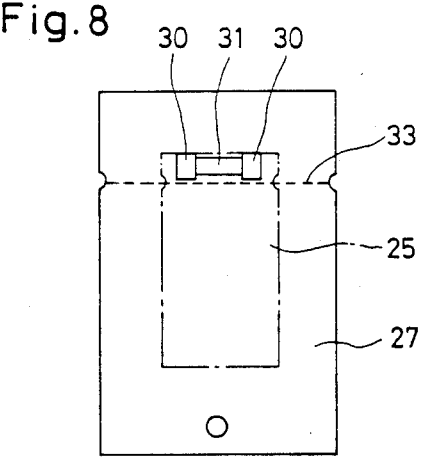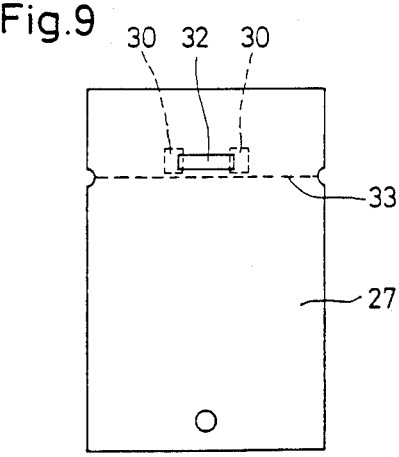

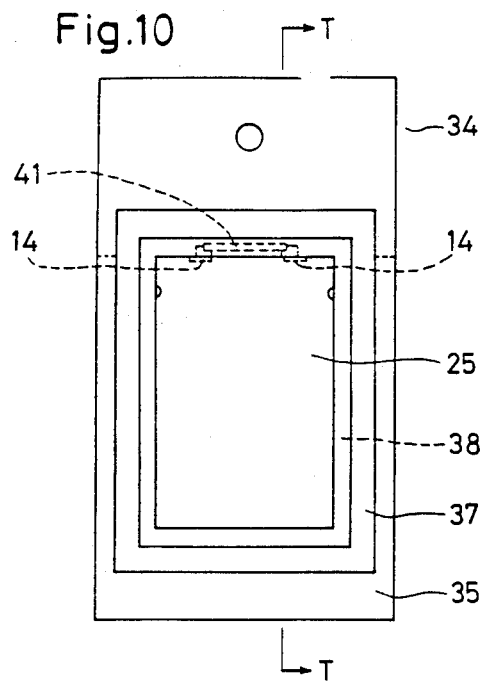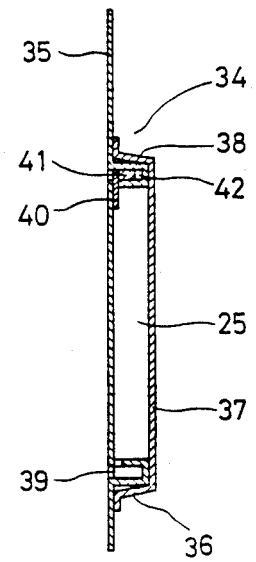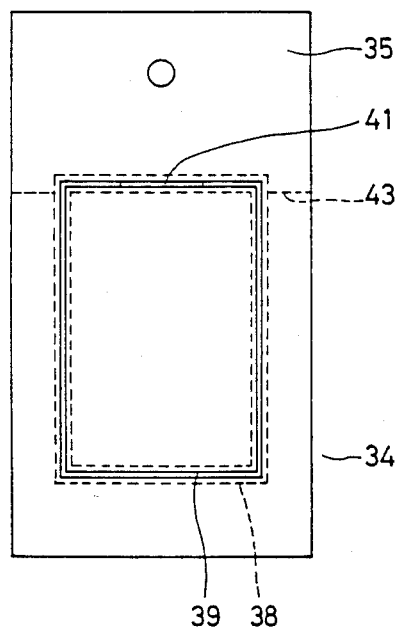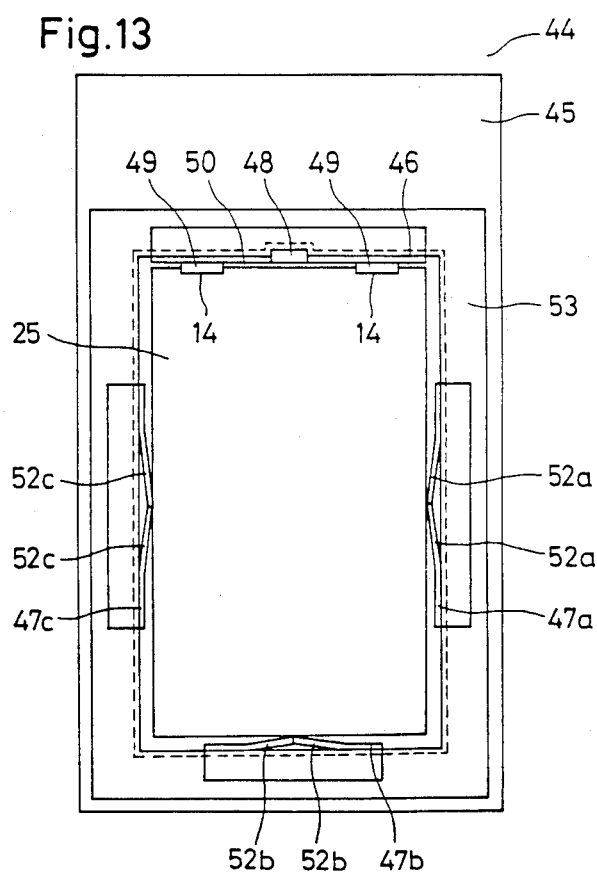

PRESERVATION DEVICE FOR LEAD STORAGE BATTERY

This is a continuation, of application Ser. No. 588,542, filed Mar. 12, 1984, now abandoned.

FIELD OF THE ART

The present invention relates to a preservation device for lead storage battery, and more particularly, a preservation device for a so-called retainer-type lead storage battery having an electrolyte limited in amount such that substantially there is no liberated electrolyte.

BACKGROUND OF THE INVENTION

In a retainer-type lead storage battery, the electrolyte is limited in amount and the negative electrode has capacity larger by 10–30% than that of the positive electrode. Accordingly, when the battery is charged, the positive electrode is fully charged before the negative electrode. Oxygen generated from the positive electrode due to overcharge is absorbed and consumed by the negative electrode.

After assembly, lead storage batteries of this type are generally subjected to forming and then delivered or preserved in a full-charge state. Until they are put to actual use, it is required that they are supplementarily charged at regular intervals, for example every six months and preferably every three months, in order to preserve such batteries at all times substantially in a full-charge state.

Lead storage batteries generally undergo self-discharge of about 0.1–0.15% of the battery capacity for every day, thereby to reduce their capacity due to self-discharge of 20–30% for a period of six months.

If a discharge product produced by self-discharge of a battery can be activated by charging or if the battery capacity can be restored, it is not required to supplementarily charge the battery so often. However, when a battery is left in a self-discharge state for a long period of time, a discharge product or lead sulfate ($PbSO_4$) is inactivated, thereby to reduce the charging efficiency. Accordingly, the capacity cannot be sufficiently restored to provoke a decrease in battery characteristic, thus requiring frequent maintenance of supplementary charge. Such maintenance is not only troublesome, but also includes the problem that the battery capacity cannot be fully restored even with repeated supplementary charge.

FIG. 1 is a graph of self-discharge characteristics showing the capacity rates to an initial battery capacity of the battery capacity where the batteries were discharged at room temperature (20° C.) after leaving for various periods of time under such discharging condition that they were discharged with a current corresponding to 0.1 c and stopped discharging when the voltage of battery was reached 1.7 V.

FIG. 2 is a graph of the capacity reset characteristics showing the capacity reset rates to an initial battery capacity of the battery capacity where the batteries were charged with a constant voltage (2.5 V) for 16 hours and then discharged with the above discharge condition, after leaving for various periods of time.

In FIG. 1 and FIG. 2, the initial capacity of battery which was discharged immediately after forming under the above discharge condition, is defined as 100%.

According to the studies of the inventor and other, batteries are slowly decreased in voltage by self-discharge when they are left after subjected to forming. With such self-discharge, there are chemically bonded $Pb^{++}$ ions in the corrosion layer of lead dioxide ($PbO_2$) on the surface of the collector member or $Pb^{++}$ ions of the active material $PbO_2$ with $SO_4^{--}$ ions in the $H_2SO_4$ electrolyte, thereby to produce lead sulfate ($PbSO_4$). When batteries are left for a long period of time, such lead sulfate ($PbSO_4$) easily becomes inactivated. This decreases the charging efficiency when batteries are re-charged, so that the capacity cannot be fully restored to deteriorate the battery characteristics. Such deterioration becomes greater as the supplementary charging cycle period is longer or batteries are left for a longer period of time. Such deterioration is further accelerated when batteries are left in a high temperature atmosphere.

OBJECT OF THE INVENTION

It is an object of the present invention to provide a preservation device for lead storage battery capable of preventing a battery preserved in such preservation device from being deteriorated in characteristics without requiring troublesome maintenance such as supplementary charging at regular intervals, even though it is left and preserved for a long period of time.

DISCLOSURE OF THE INVENTION

A preservation device for lead storage battery in accordance with the present invention comprises: a lead storage battery having at least one negative plate, at least one positive plate, at least one separator between these plates, an electrolyte holdingly impregnated by the both plates and the separator and limited in amount such that substantially there is no electrolyte liberated from these plates and separator, and external terminals each having one end respectively connected to the negative plate and positive plate and the other ends exposed to the outside of the battery vessel; and impedance means connected between the external terminals of the lead storage battery while it is preserved.

BRIEF DESCRIPTION OF THE DRAWINGS

FIG. 5 is an exploded perspective view of other example of a lead storage battery applied to a preservation device in accordance with the present invention.

FIG. 6 is a perspective view of a first embodiment of preservation device in accordance with the present invention.

FIG. 7 is a section view of FIG. 6 taken along the line S—S therein.

FIG. 8 is a front view of a base member in FIG. 6.

FIG. 9 is a back view of other example of the base member used in the preservation device of the present invention.

FIG. 10 is a front view of a second embodiment of the preservation device of the present invention.

FIG. 11 is a section view of FIG. 10 taken along the line T—T therein.

FIG. 12 is a back view of FIG. 10.

FIG. 13 is a third embodiment of the preservation device of the present invention.

DETAILED DESCRIPTION OF THE PREFERRED EMBODIMENTS

Figure 1:
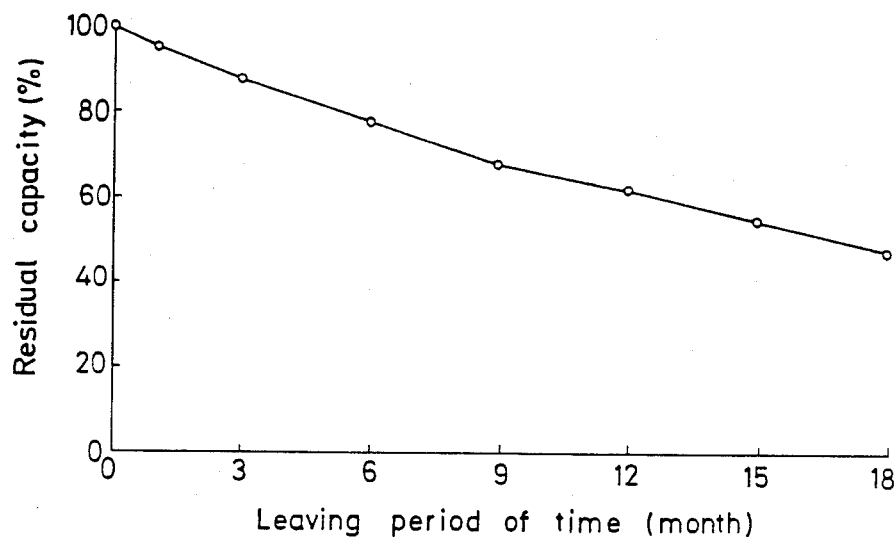
FIG. 1 shows self-discharge characteristics of lead storage batteries.
Figure 2:
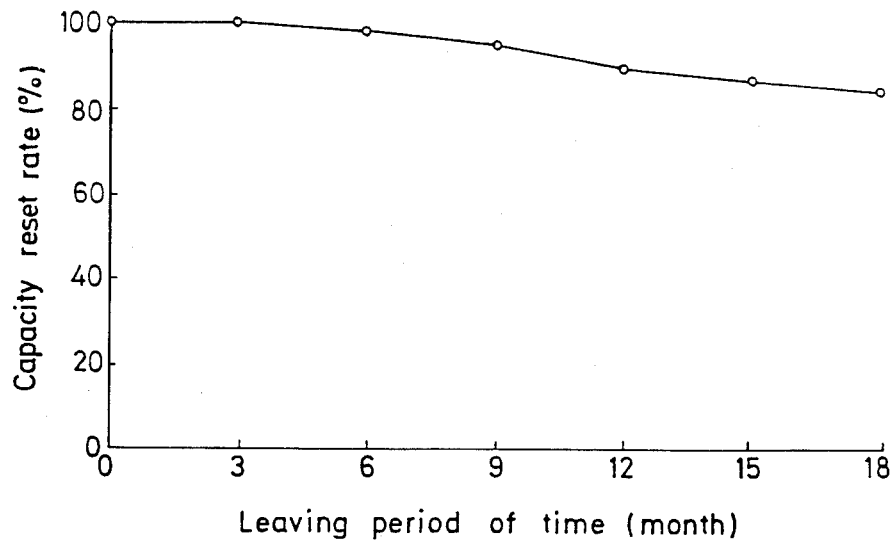
FIG. 2 shows capacity reset characteristics of lead storage batteries left for various periods of time.
Figure 3:
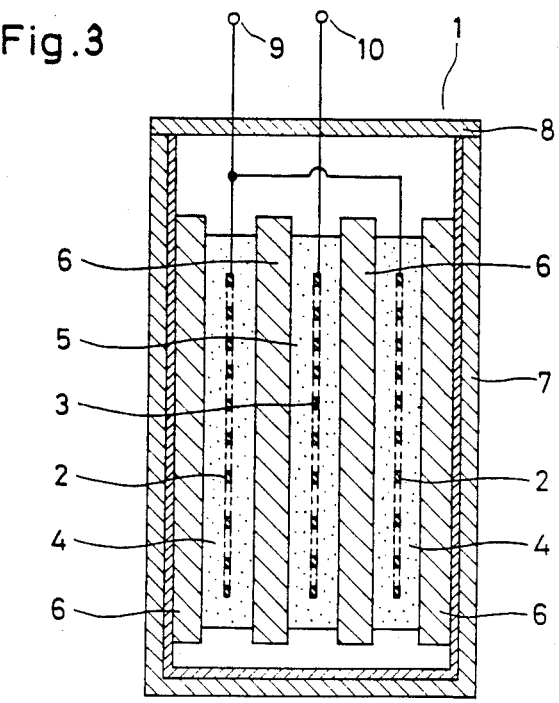
FIG. 3 is a section view of one example of a lead storage battery applied to preservation device in accordance with the present invention.

The description hereinafter will be made of one example of a lead storage battery applied to the present invention, with reference to FIG. 3 showing the section view thereof.

A lead storage battery 1 is made in the following way.

A lead-calcium alloy is subjected to casting, punching or expanding, and cut into a piece of $50 \times 50 \times 1$ mm as a negative collector member 2 and a piece of $50 \times 50 \times 2$ mm as a positive collector member 3. An active material paste of lead monoxide (PbO) and water, is rolled by a roller, so that active material layers of $50 \times 50 \times 0.7$ mm and $50 \times 50 \times 1.0$ mm are formed. These sheet-like active material layers are respectively contact-pressed to the negative collector member 2 and the positive collector member 3 at the both sides thereof, thereby to form a negative plate 4 and a positive plate 5. The final negative plate 4 has a thickness of 1.2 mm, while the final positive plate 5 has a thickness of 2.4 mm.

An electrode assembly is formed by putting alternately one positive plate 5 and two negative plates 4 made as discussed above, with glass fiber separators 6 disposed between the positive plate 5 and the negative plates 4. This electrode assembly is disposed in a battery jar of resin 7.

An amount of 10 cc of a sulphuric acid electrolyte having specific gravity of 1.30 is poured into the jar 7. After the electrolyte has been holdingly impregnated by the negative plates 4, the positive plate 5 and the separators 6, a battery jar lid 8 having a negative external terminal 9 and a positive external terminal 10 is mounted to the battery jar 7, thus forming a lead storage battery having capacity of 1 AH. Such lead storage battery may be used after subjected to forming. The vessel consists of said jar 7 and jar lid 8.

The present invention provides a preservation device for preserving such lead storage battery with an impedance means made by resistance for example, being connected between the external terminals 9 and 10 of the battery 1.

This impedance means is preferably set to such value that a lead storage battery housed in the preservation device discharges with a current smaller than that corresponding to the 5-hour rate (0.2 c). In the embodiment, there is connected resistance of 20 ohms corresponding to the 0.1 c current of the lead storage battery 1.

Comparison is then made in performance between the lead storage battery A preserved in the preservation device according to this embodiment, and comparative lead storage batteries B, C and D preserved with their external terminals opened for the comparison purpose.

The comparative lead storage battery B discharged with a constant current corresponding to 0.1 c until the discharge stop voltage (1.7 V) was reached. The battery B was thereafter preserved with the external terminals opened. In the battery B, the self-discharge rate is substantially 100%.

The comparative lead storage battery C discharged by 0.5 AH with a constant current corresponding to 0.1 c and then preserved with the external terminals opened. In the battery C, the self-discharge rate is substantially 50%.

The comparative lead storage battery D was preserved with the external terminals opened immediately after subjected to forming.

Tests and measuring were conducted under simulation of various self-discharge rates of the lead storage batteries A,B,C and D preserved for a long period of time. Namely, after subjected to forming as charged for 24 hours with a current density corresponding to 1.5 $A/dm^2$, the lead storage batteries A,B,C and D were left for 3 months and 6 months in an atmosphere of 40° C. for the purpose of accelerated tests. The batteries A,B,C and D were then charged with a constant voltage of 2.5 V for 16 hours and discharged with a current corresponding to 0.1 c. Measurement was made on discharge capacity where the discharge stop voltage of 1.7 V was reached.

Figure 4:
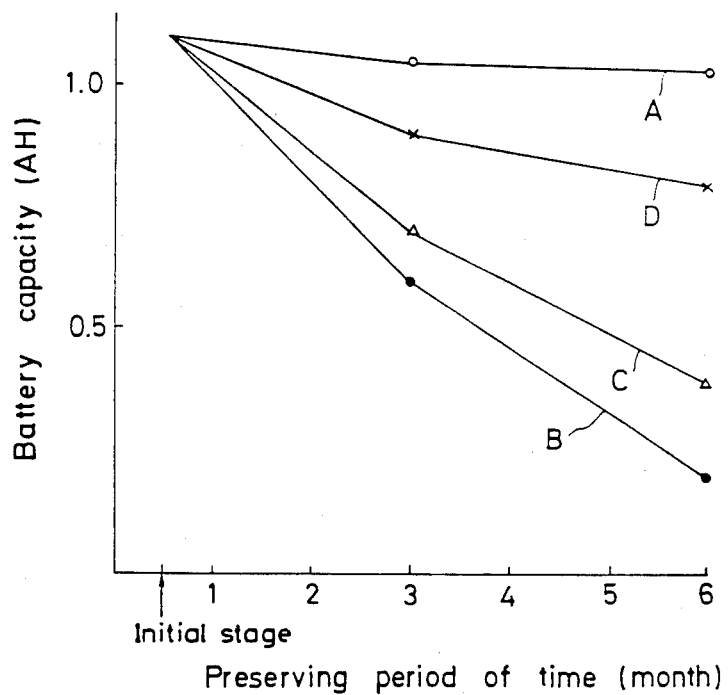
FIG. 4 is a graph for comparing in performance a lead storage battery A preserved in the preservation device of the present invention with other lead storage batteries B,C & D for the comparison purpose.

FIG. 4 is a graph showing the test results as to performances of the lead storage battery A preserved in the preservation device of the present invention, and the comparative lead storage batteries B,C and D. From FIG. 4, it is found that the lead storage battery A preserved in the preservation device of the present invention satisfies the rated capacity even after preserved for 6 months. From FIG. 4, it is also found that the comparative lead storage batteries B,C and D are decreased in charging efficiency, in particular where such batteries were charged with a constant voltage after preserved for a long period of time. Such decrease in charging efficiency is caused by the fact that, when a battery is preserved for a long period of time with the terminals opened, the corrosion layer of $PbO_2$ produced on the positive collector surface by forming is transformed into $Pb^{++}$ ions, and such $Pb^{++}$ ions are reacted to and bonded with $SO_4^{--}$ ions remaining in the electrolyte, thereby to produce an inactive $PbSO_4$ layer. Such reaction provokes voltage build-up at the time of charging made after the battery has been preserved. This results in defective charge.

On the other hand, when a battery is left and preserved in the preservation device of the present invention with its impedance means connected between the both external terminals of the battery, a discharge current flows correspondingly to the discharge voltage produced due to load connection. Accordingly, a micro-current discharge is made at the final discharge stage. With discharge from the active material more advanced, the battery stops discharging uniformly around the plate surfaces, and the $SO_4^{--}$ ions remaining in the electrolyte are substantially consumed. This restrains generation of $PbSO_4$ by $SO_4^{--}$ and $Pb^{++}$ in the $PbO_2$ corrosion layer of the collector member. Therefore, after left and preserved in the preservation device of the present invention even for a long period of time, the battery does not exhibit the problem that a charging current flow is decreased due to transformation of the $PbO_2$ corrosion layer to $PbSO_4$ during such preservation. Accordingly, a battery preserved in the preservation device of the present invention even for a long period of time, may be efficiently charged, in particular with a constant voltage, thereby to prevent the battery from being decreased in characteristic.

The description will be then made of a first embodiment of the present invention with reference to FIGS. 5–8.

The description firstly discusses one example of a lead storage battery applied to this first embodiment, with reference to FIG. 5 showing the exploded perspective view of such battery.

Plate-shape collector members 13 are respectively secured to the inner surfaces of a resin member 11 composing a part of a battery jar, and a battery jar lid 12 engaged with the opening of the resin member 11.

Each of the resin member 11 and the battery jar lid 12 is formed integrally with the plate-shape collector member 13 of a Pb-Ca alloy, an external terminal 14 and a lead wire 15 for connecting the external terminal 14 to the collector member 13, according to insert-molding with the use of an ABS resin. The external terminals 14 of negative and positive plates are located on the same plane. The resin member 11 has a valve chamber 16 in which a safety valve is disposed, a frame-shape engagement groove 18 to engage with a frame-shape projection wall 17 on the inner surface of the battery jar lid 12, and a gas hole 19 for discharging gas.

Housed in the resin member 11 is an electrode assembly including a negative active material layer 21 held by a resin material 20, a separator 22 and a positive active material layer 24 held by a resin material 23. At this time, the plate-shape collector member 13 comes in contact with one side of the negative active material layer 21 or the positive active material layer 24.

A necessary amount of a sulfuric acid electrolyte having specific gravity of 1.30 is poured onto the electrode assembly. Since the area of the electrode assembly to receive the electrolyte is relatively large, the inside air or a generated gas is easily substituted so that the electrolyte is holdingly impregnated immediately by the electrode assembly.

The resin member 11 and the battery jar lid 12 are then secured to each other and hermetically sealed. The battery may then be used after subjected to forming.

The description will then be made of the first embodiment of the preservation device for preserving such lead storage battery 25 of the thin plate shape of the present invention, with reference to FIGS. 6–8.

A housing member 26 for housing the lead storage battery 25 includes a base member 27 made of a thick paper or resin for example hard vinyl chloride or ABS, and a transparent covering member 29 which has a peripheral edge attached to the base member 27 and, at the center thereof, an expanded portion 28 of which the shape corresponds to the shape of the lead storage battery 25 to be housed. Thus, the lead storage battery 25 is adapted to be housed as held by and between the expanded portion 28 and the base member 27.

The base member 27 has, at the positions thereof corresponding to the both external terminals 14 of the lead storage battery 25, contact members 30 secured thereto adapted to respectively come in contact with the both external terminals 14. Connected between the both contact members 30 is an impedance means comprising an impedance element 31 such as resistance. This impedance element 31 is formed by, for example, a printed resistance, and secured to the base member 27. For example, a printed resistance or the like is seucred to the base member 27 as printed thereon. As shown in FIG. 9, resistance 32 or the like may also be secured to the reverse side of the base member 27.

The base member 27 has a perforation 33 or the like to facilitate the removal of the lead storage battery 25 from the housing member 26.

When the lead storage battery 25 after subjected to forming, is housed in the housing member 26, it means that the impedance element 31 such as resistance is connected, through the both contact members 30, between the external terminals 14 of the lead storage battery 25.

After preserved in such state, the lead storage battery 25 may be removed from the housing member 26 and charged when it is actually used. Thus, such lead storage battery may be used with its original characteristics not deteriorated without requiring any maintenance such as supplementary charging.

The description will then be made of a second embodiment of the present invention with reference to FIGS. 10–12.

Likewise the first embodiment in FIG. 6, a housing member 34 for housing the lead storage battery 25 shown in FIG. 5, includes a base member 35 and a covering member 37 having a peripheral edge attached to the base member 35 and, at the center thereof, an expanded portion 36 of which the shape corresponds to the shape of the lead storage battery 25. The lead storage battery 25 is housed in the housing member 34 as held by and between the expanded portion 36 and the base member 35.

The base member 35 has a projection wall 38 for positioning the lead storage battery 25. According to press machining, this projection wall 38 is formed into a frame shape so as to surround the lead storage battery 25. The base member 35 has on the reverse side thereof a concave portion 39.

The base member 35 has, at the positions thereof corresponding to the both external terminals 14 of the lead storage battery 25, contact members 40 secured thereto adapted to respectively come in contact with the external terminals 14. An impedance element 41 similar to that in FIG. 6, is connected between these contact members 40. This impedance element 41 is formed by a printed resistance or the like and secured to the base member 35. For example, a printed resistance or the like may be secured to the surface of the base member 35 as printed thereon, or resistance may be secured to the reverse side of the base member 35. In this second embodiment, the impedance element 41 is disposed in a hollow portion 42 of the projection wall 38. Such arrangement enables the projection wall 38 to also serve as a protection wall of the impedance element 41.

The base member 35 has a perforation 43 or the like to facilitate the removal of the lead storage battery 25 from the housing member 34.

Although the projection wall 38 is made hollow in the second embodiment, the projection wall 38 is not limited to the hollow construction but may be formed into any shape as far as it can position the lead storage battery 25.

According to the second embodiment, the impedance element 41 can be securely connected automatically between the both external terminals 14 of the lead storage battery 25 when the lead storage battery 25 is housed and preserved in the housing member 34 as positioned by the projection wall 38 of the base member 35.

According to the second embodiment, the positioning projection wall 38 may also serve as a protective wall of the impedance element 41 since the impedance element 41 is disposed in the hollow portion 42 of the projection wall 38.

The description will then discuss a third embodiment of the present invention with reference to FIGS. 13–17.

A base member 45 of a housing member 44 for housing the lead storage battery 25 in FIG. 5 is made of a thin plate of an opaque resin such as vinyl chloride or an ABS resin. The base member 45 has, on its four sides, cut-up pieces 46, 47a, 47b and 47c located outside of the positions corresponding to the external shape of the lead storage battery 25 when placed on the base member 45. The cut-up piece 46 has a pair of terminal receiving members for coupling 49 between which a chip resistance 48 constituting an impedance means is disposed. These terminal receiving members 49 and the chip resistance 48 are attached to the surface of the cut-up piece 46 and connected to each other by a printed pattern 50 including contact members.

Figure 14:
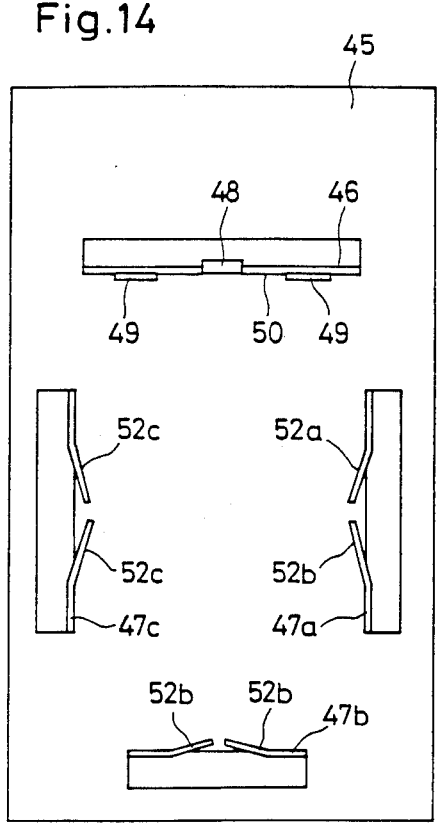
FIG. 14 is a front view of a base member in FIG. 13.
Figure 15:
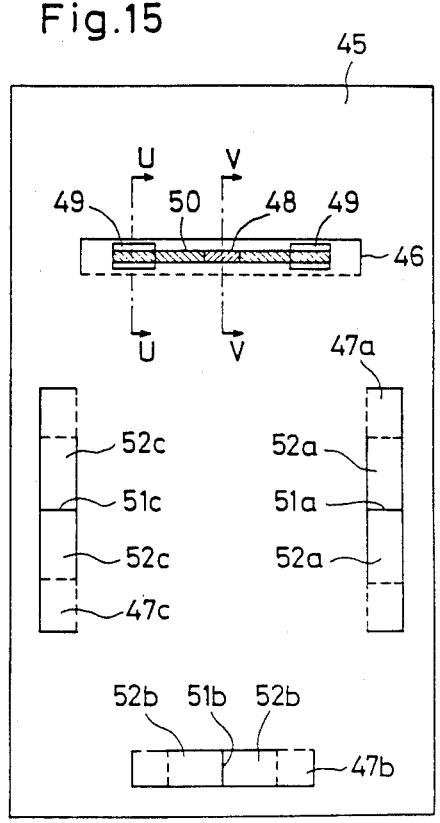
FIG. 15 is a front view of the base member in FIG. 14 with cut-up pieces not raised up.
Figure 16:
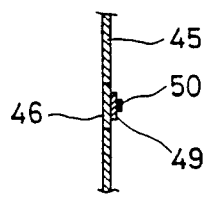
FIG. 16 is a section view of FIG. 15 taken along the line U—U therein.
Figure 17:
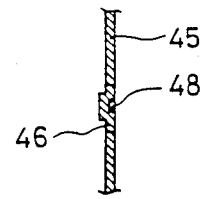
FIG. 17 is a section view of FIG. 15 taken along the line V—V therein.

FIG. 15 shows the base member 45 with the cut-up pieces 46, 47a, 47b and 47c not raised up. As shown in FIG. 15, the cut-up pieces 47a, 47b and 47c respectively have slits 51a, 51b and 51c at the longitudinal centers thereof. These cut-up pieces 46, 47a, 47b and 47c are raised up toward the surface of the base member 45 as shown in FIG. 14. At this time, the chip resistance 48 and the terminal receiving members 49 are inwardly turned. After raised up, the cut-up pieces 47a, 47b and 47c are inwardly turned by the respective slits 51a, 51b and 51c, thereby to form three pairs of resilient pieces 52a, 52b and 52c.

The lead storage battery 25 is then housed in the space defined by the cut-up pieces 46, 47a, 47b and 47c. At this time, the chip resistance 48 is electrically connected to the external terminals 14 of the lead storage battery 25 through the printed circuit pattern 50. The resilient pieces 52a, 52b and 52c are effective in securely fixing the lead storage battery 25.

The lead storage battery 25 thus fixed to the base member 45 with the chip resistance 48 connected between the external terminals 14, is covered with a covering member 53 and hermetically sealed. The covering member 53 is made by vacuum-molding of a transparent styrol resin, and is attached to the base member 45 by adhesives or pressingly sticked thereto by heating.

According to the third embodiment, the impedance means is not embedded in resin according to insert-molding or the like. Thus, the impedance means is neither applied by heat generated during molding nor an excessive pressure due to contraction after molding, thereby to improve the reliability of the impedance means.

The cut-up piece 46, 47a, 47b and 47c or the resilient pieces 52a, 52b and 52c may push the lead storage battery 25 in the inner direction of the housing member 44. Such construction prevents the lead storage battery 25 from positionally shifting in transit. It is therefore possible to maintain impedance-connection of the lead storage battery 25 in the optimum condition.

Figure 18:
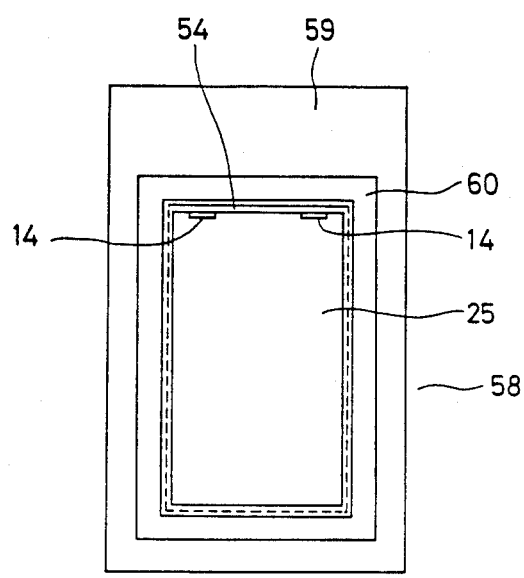
FIG. 18 is a front view of a forth embodiment of the preservation device of the present invention.
Figure 19:
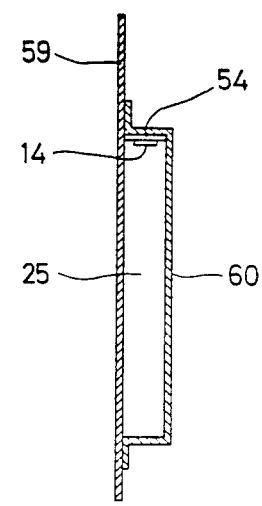
FIG. 19 is a section view in side elevation of FIG. 18.
Figure 20:
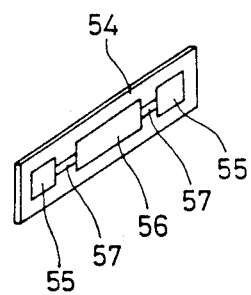
FIG. 20 is a perspective view of a base plate in FIG. 18.

The description will then be made of a forth embodiment of the present invention with reference to FIGS. 18–20.

A board 54 is disposed to face to the external terminals 14 of the lead storage battery 25 and has contact members 55 printed thereon at the positions thereof corresponding to the external terminals 14. Disposed between these contact members 55 is an adhesive tape resistance 56 constituting an impedance means. This adhesive tape resistance 56 is electrically connected to the contact members 55 through connection members 57 printed on the board 54. After the circuit has been printed on the board 54 by etching or the like, the adhesive tape resistance 56 is attached to the board 54, which is then subjected to printing in a pyrostat of 300° C. for 5–6 hours, so that the adhesive tape resistance 56 is fixed to the board 54.

After subjected to forming, the lead storage battery 25 is housed in a housing member 58 with the board 54 attached to that surface of the lead storage battery 25 on which the external terminals 14 are disposed. The housing member 58 includes a plate-shape base member 59 made of a transparent resin, for example vinyl chloride or an ABS resin, and a covering member 60 made by vacuum-molding of a transparent styrol resin. The covering member 60 is attached to the base member 59 by adhesive or pressingly sticked thereto by heating. Such sealed lead storage battery is delivered from the factory and preserved at retail shops or the like.

After the adhesive tape resistance 56 has been attached to the base member 59, the portion of the board 54 including the resistance 56 and the contact members 55 may be broken away and raised upward from the base member 59 so as to face to the lead storage battery 25.

According to the forth embodiment of the present invention, the contact members 55 and the adhesive tape resistance 56 are disposed on the inner surface of the covering member 60, so that it is not required to embed the impedance means into the base member according to insert-molding or the like. Thus the impedance means is neither applied by heat generated during molding nor an excessive pressure due to contraction after molding, thereby to improve its reliability.

The board 54 having the impedance means may be formed as an independent member. In such case, when a lead storage battery is to be preserved as removed from the housing member 58, the adhesive tape resistance 56 may be attached to that portion of the lead storage battery on which the external terminals 14 are disposed. Thus, impedance-connection may be easily provided.

Figure 21:
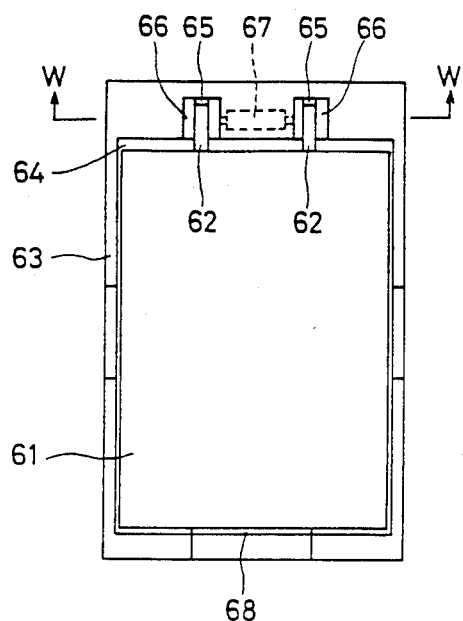
FIG. 21 is a front view of a fifth embodiment of the preservation device in accordance with the present invention.
Figure 22:
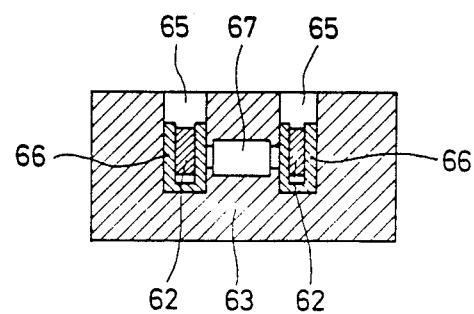
FIG. 22 is a section view of FIG. 21 taken along the line W—W therein.
Figure 23:
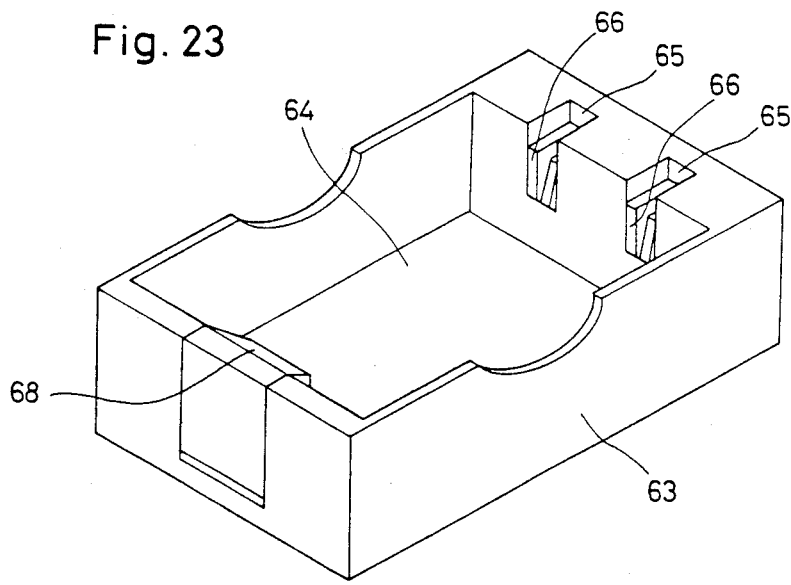
FIG. 23 is a perspective view of a housing case in FIG. 21.

The description will then be made of a fifth embodiment of the present invention with reference to FIGS. 21-23.

According to this fifth embodiment, a lead storage battery 61 to be housed, has external terminals 62 projected from the battery vessel. The lead storage battery 61 is housed in a housing case 63 of which the top is opened. The housing case 63 has a concave portion 64 for housing the lead storage battery 61, and two grooves 65 at the tip of the case 63. Disposed in the grooves 65 are terminal receiving members 66 to come in contact with the external terminals 62. The terminal receiving members 66 have resiliency to facilitate the insertion of the external terminals 62 therein.

The housing case 63 has therein an impedance means 67 connected to the terminal receiving members 66. The housing case 63 has, at the rear end thereof, a resilient piece 68 which applies spring-load to the lead storage battery in the direction toward the terminal receiving members 66. The housing case 63 is made of resin such as ABS or polypropylene and formed integrally with the terminal receiving members 66 and resistance as the impedance means 67 according to insert-molding.

According to this fifth embodiment, with the external terminals 62 of the lead storage battery 61 inserted into the terminal receiving members 66, the lead storage battery 61 is housed in the concave portion 64. The impedance means 67 is thus connected between the external terminals 62 through the terminal receiving members 66.

Figure 24:
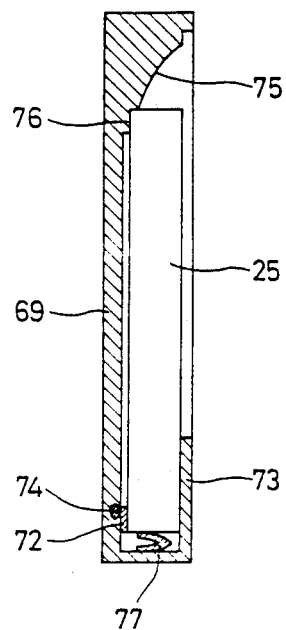
FIG. 24 is a section view in side elevation of a sixth embodiment of the preservation device in accordance with the present invention.
Figure 25:
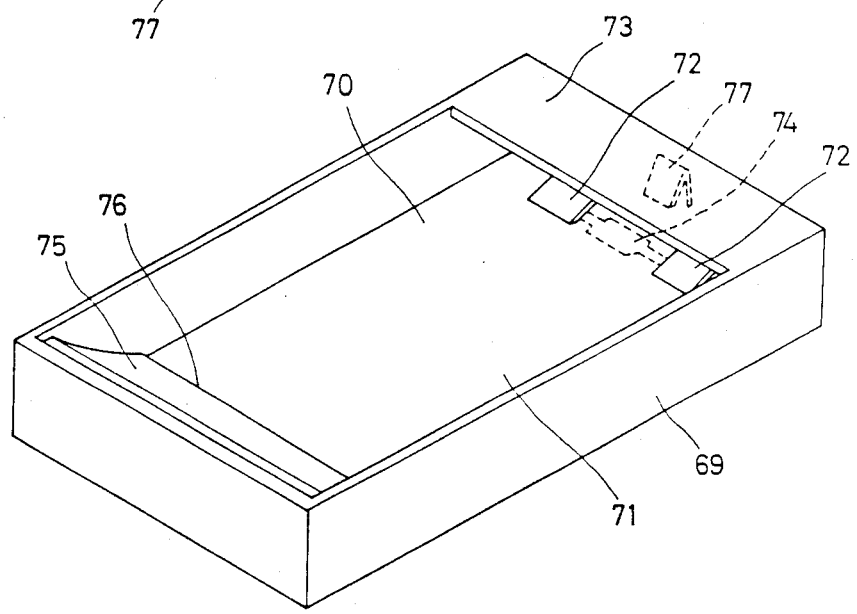
FIG. 25 is a perspective view of a housing case in FIG. 24.
Figure 26:
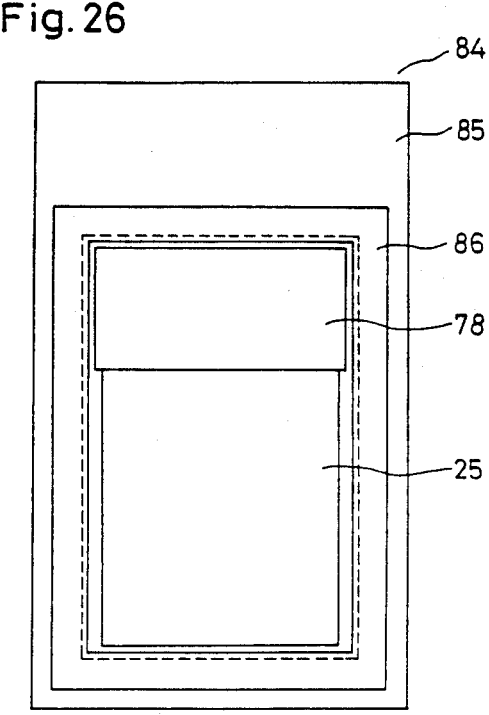
FIG. 26 is a front view of a seventh embodiment of the preservation device in accordance with the present invention.
Figure 27:
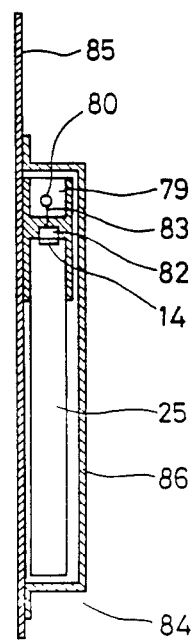
Figure 28:
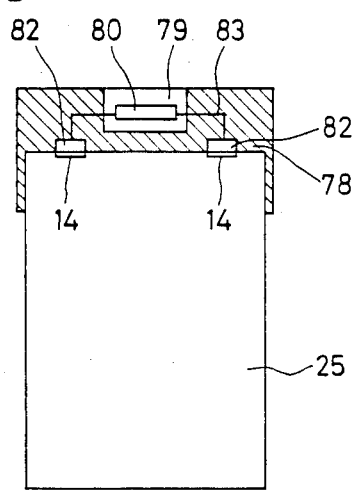
FIG. 28 is a partial section view in front elevation of a lead storage battery in FIG. 26 with a cap mounted thereon.
Figure 29:
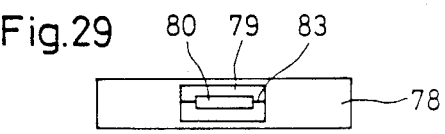
FIG. 29 is a plan view of FIG. 28.
Figure 30:
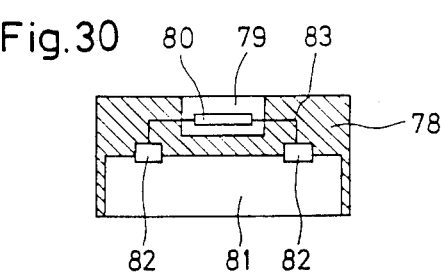
FIG. 30 is a section view in front elevation of the cap in FIG. 26.
Figure 31:
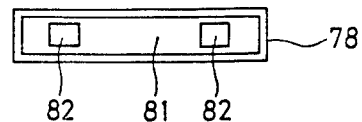
FIG. 31 is a bottom view of FIG. 30.
Figure 32:
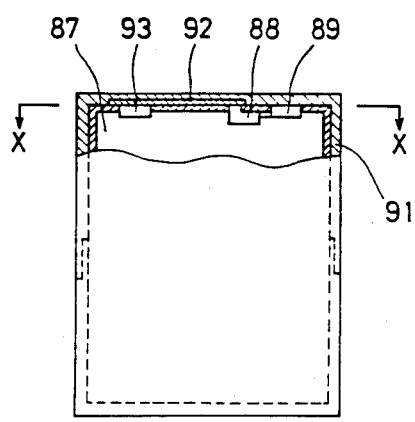
FIG. 32 is a partial section view in front elevation of a eighth embodiment of the preservation device in accordance with the present invention.
Figure 34:
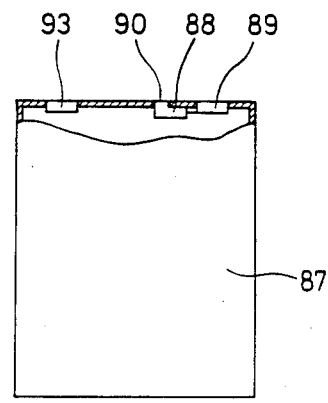
FIG. 34 is a partial section view in front elevation of the lead storage battery in FIG. 32.
Figure 33:
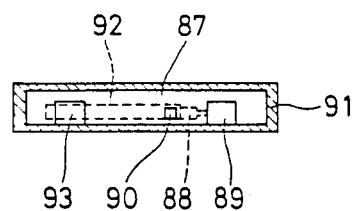
FIG. 33 is a section view of FIG. 32 taken along the line X—X therein.
Figure 35:
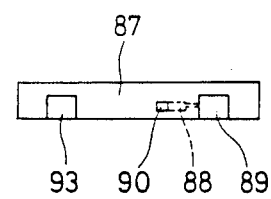
FIG. 35 is a plan view of the lead storage battery in FIG. 34.

The description will then be made of a sixth embodiment with reference to FIGS. 24-25.

According to the sixth embodiment, there is housed the lead storage battery 25 of the thin plate type shown in FIG. 5.

The lead storage battery 25 is housed in a housing case 69 of which the top is opened. The housing case 69 has a concave portion 70. Disposed on the bottom plate 71 of the concave portion 70 are terminal receiving members 72 respectively adapted to come in contact with the external terminals 14 of the lead storage battery 25. The terminal receiving members 72 are made of leaf springs to apply a upward spring-load. When inserted in the housing case 69, the lead storage battery 25 is held by and between a top plate 73 and the terminal receiving members 72 of the housing case 69 at its front end. Resistance 74 as an impedance means is connected between the terminal receiving members 72.

The housing case 69 has at its rear end a curved surface 75 for smoothly guiding the lead storage battery 25 when it is inserted. The curved surface 75 has at its terminal end a step portion 76 to which a leaf spring 77 disposed in the housing case 69 at its front end, pushes the housed lead storage battery 25.

Likewise the fifth embodiment shown in FIG. 21, the housing case 69 is made of resin such as ABS and formed integrally with the terminal receiving members 72, the resistance 74 and the leaf spring 77 according to insert-molding.

When the lead storage battery 25 is housed in the housing case 69, the resistance 74 as the impedance means is connected between the external terminals 14 through the terminal receiving members 72.

The housing case 69 according to the sixth embodiment of the present invention, enables the lead storage battery 25 to be easily housed and removed, and may be used any number of times for preserving the lead storage battery 25.

The description will then be made of a seventh embodiment of the present invention with reference to FIGS. 26-31.

A cap 78 as a mounting member is mounted to the lead storage battery 25 shown in FIG. 5 for covering a portion thereof. The cap 78 made of a synthetic resin, has in the top surface thereof, a concave portion 79, in which a solid resistance 80 equivalent to 0.1 c is disposed as an impedance means. The cap 78 has, in the lower portion thereof, a concave portion 81 into which the lead storage battery 25 is inserted at the upper end thereof. The concave portion 81 has a pair of contact members 82 on the upper surface thereof at its positions corresponding to the external terminals 14 of the lead storage battery 25. These contact members 82 are connected to the solid resistance 80 through connection members 83 of lead wires. When the cap 78 is mounted on the lead storage battery 25 at its upper end, the contact members 82 come in contact with the external terminals 14.

With the cap 78 mounted on the lead stroage battery 25 after subjected to forming, the lead storage battery 25 is housed in a housing member 84. The housing member 84 includes a plate-shape base member 85 made of a transparent resin such as vinyl chloride or ABS, and a covering member 86 made by vacuum-molding of a transparent styrol resin.

With the cap 78 mounted on the lead storage battery 25 after subjected to forming and the solid resistance 80 as an impedance means connected between the external terminals 14, the lead storage battery 25 is disposed on the base member 85. The covering member 86 is attached to the base member 85 by adhesives or pressingly sticked thereto by heating. The lead storage battery 25 is then preserved.

According to this seventh embodiment, the impedance means is housed in the concave portion 79 of the cap 78, and is not embeded in a resin member according to insert-molding, etc. Thus, the impedance means is neither applied by heat generated during molding nor an excessive pressure due to contraction after molding, so that the reliability of the impedance means is greatly improved.

Moreover, the preservation device according to this seventh embodiment enables the cap 78 including the impedance means to be easily attached to and removed from the lead storage battery 25 after it has been taken out from the housing member 84. This advantageously permits the lead storage battery 25 to be again left and preserved for a long period of time.

The description will then be made of an eighth embodiment of the present invention with reference to FIGS. 32-35.

A chip resistance 88 as an impedance means is directly secured to a lead storage battery 87 similar to the lead storage battery 25 in FIG. 5. The chip resistance 88 has one end connected to one external terminal 89 of the lead storage battery 87 and the other end which is exposed to form an exposed portion 90.

On delivery from the factory, the lead storage battery 87 is housed in a covering member 91 of the housing case type to be separable into two portions. The covering member 91 has at the upper inner surface thereof a printed connection member 92 of an electroconductive pattern film. When the lead storage battery 87 is covered with the covering member 91, this connection member 92 electrically connects the other end of the chip resistance 88 to the other external terminal 93 of the lead storage battery 87.

The lead storage battery 87 manufactured at factory is, after fully charged, covered with the covering member 91 to provide impedance-connection between the external terminals 89 and 93, through the chip resistance 88 and the connection member 92.

For the use, the removal of the covering member 91 from the lead storage battery 87 shuts off the electrical connection between the chip resistance 88 and the external terminals 89 & 93, permitting the lead storage battery 87 to be immediately used.

Even if the covering member 91 is lost, application of an electroconductive tape across the chip resistance 88 and the other external terminal 93 may easily provide impedance-connection.

Moreover, the construction of the impedance means attached to the lead storage battery itself 87 eliminates the risk to loose the impedance means.

Industrial Utility

According to the preservation device for lead storage battery of the present invention, a retainer-type lead storage battery is preserved with an impedance means connected between the external terminals of the lead storage battery. This restrains transformation of the $PbO_2$ corrosion layer on the collector member surface into an inactive $PbSO_4$ layer.

It is therefore possible to prevent a battery preserved in such preservation device from being decreased in capacity without requiring troublesome maintenance such as supplementary charging at regular intervals, even though it is preserved for a long period of time from its forming to the actual use. The present invention thus exhibits a great industrial value.

What we claim is:

1. A preservation device for a lead storage battery of the type including at least one negative plate, at least one positive plate, at least one separator between said negative and positive plates, an electrolyte impregnated in said negative and positive plates and said separator and held therein, and said electrolyte being limited in amount such that there is substantially no electrolyte liberated from said negative and positive plates and said separator, and external terminals having first ends respectively connected to said negative and positive plates and second ends external to said battery, said preservation device comprising:
   an impedance connected between said external terminals of said lead storage battery while it is in storage after it has been fully charged;
   a housing member for housing said lead storage battery during said storage; and
   contact members secured to said housing member and adapted to respectively come in contact with said external terminals of said lead storage battery, and wherein;
   said impedance means is secured to said housing member and connected between said contact members.

2. A preservation device for lead storage battery as set forth in claim 1, wherein the impedance means is a resistance.

3. A preservation device for lead storage battery as set forth in claim 1, wherein the impedance means is set to such value that the lead storage battery preserved in the preservation device discharges with a current smaller than that corresponding to the 5-hour rate.

4. A preservation device for lead storage battery as set forth in claim 1, wherein;
   the housing member includes a base member and a covering member having a peripheral edge secured to said base member, and
   the contact members and the impedance means are secured to said base member.

5. A preservation device for lead storage battery as set forth in claim 1, wherein;
   the housing member includes a base member and a covering member having a peripheral edge secured to said base member,
   said base member has a projection wall for positioning the lead storage battery housed in the housing member, and
   the impedance means and the contact members are secured to said projection wall.

6. A preservation device for lead storage battery as set forth in claim 1, wherein;
   the housing member includes a base member and a covering member having a peripheral edge secured to said base member,
   said base member has, at the four sides thereof, cut-up pieces located at the positions thereof outside of the external shape of the lead storage battery when placed on said base member, and
   one of said cut-up pieces has a printed pattern including contact members, and a chip resistance as the impedance means.

7. A preservation device for lead storage battery as set forth in claim 1, wherein;
   the housing member includes a base member and a covering member having a peripheral edge secured to said base member,
   the contact members and the impedance means are disposed on the inner surface of said covering member, and
   the impedance means is an adhesive tape resistance.

8. A preservation device for lead storage battery as set forth in claim 1, wherein the housing member is a case having a concave portion for housing the lead storage battery, and said case has the contact members and the impedance means.

9. A preservation device for a lead storage battery of the type including at least one negative plate, at least one positive plate, at least one separator between said negative and positive plates, an electrolyte impregnated in said negative and positive plates and said separator and held therein and limited in amount such that there is substantially no electrolyte liberated from said negative and positive plates and said separator, and external terminals having first ends respectively connected to said negative and positive plates and second ends exposed external to said battery, said preservation device comprising:
- an impedance connected between said external terminals of said lead storage battery while it is in storage after it has been fully charged;
- a mounting member mounted on the lead storage battery during said storage, and
- contact members secured to said mounting member and adapted to come in contact with external terminals of said lead storage battery, and wherein;
- said impedance means is secured to said mounting member and connected between said contact members.

10. A preservation device for lead storage battery as set forth in claim 9 wherein;
- the mounting member is a cap covering a portion of the lead storage battery,
- the impedance means is disposed in a concave portion formed in said cap, and
- the lead storage battery to which said cap is mounted, is housed in a housing member including a base member and a covering member having a peripheral edge secured to said base member.

11. The preservation device for a lead storage battery in accordance with claim 9, wherein said impedance means is a resistance.

12. The preservation device for a lead storage battery in accordance with claim 9, wherein said impedance means has a value such that said lead storage battery discharges with a current smaller than that corresponding to the five hour rate.

13. A preservation device for a lead storage battery of the type including at least one negative plate, at least one positive plate, at least one separator between said negative and positive plates, an electrolyte impregnated in said negative and positive plates and said separator and held therein and limited in amount such that there is substantially no electrolyte liberated from said negative and positive plates and said separator, and external terminals having first ends respectively connected to said negative and positive plates and the second ends exposed external said battery wherein said preservation device comprises:
- an impedance connected between said external terminals has been fully charged;
- said impedance means secured directly to said lead storage battery and having a first end connected to said first external terminal of said lead storage battery, and
- a covering member for covering said lead storage battery while it is in storage, having a connection member for connecting a second end of said impedance means to said second external terminal of said lead storage battery.

14. A preservation device for lead storage battery as set forth in claim 13 wherein the connection member comprises a pattern film printed on the covering member.

15. The preservation device for a lead storage battery in accordance with claim 13, wherein said impedance means is a resistance.

16. The preservation device for a lead storage battery in accordance with claim 13, wherein said impedance means has a value such that said lead storage battery discharges with a current smaller than that corresponding to the five hour rate.

* * * * *